2,425,685

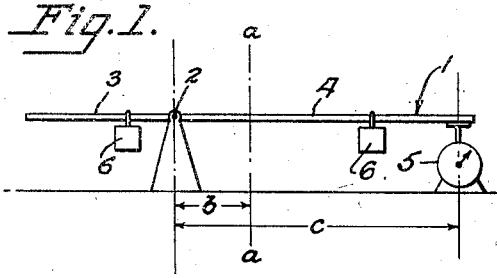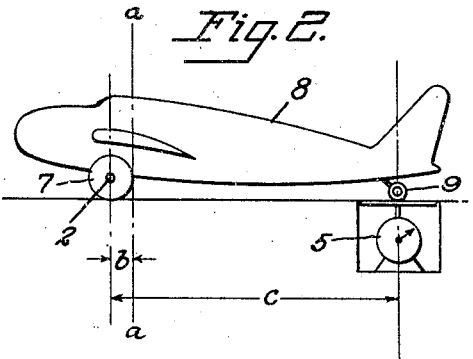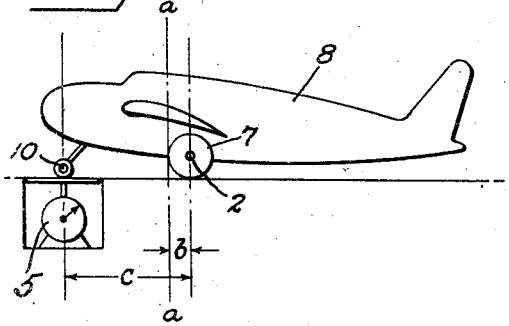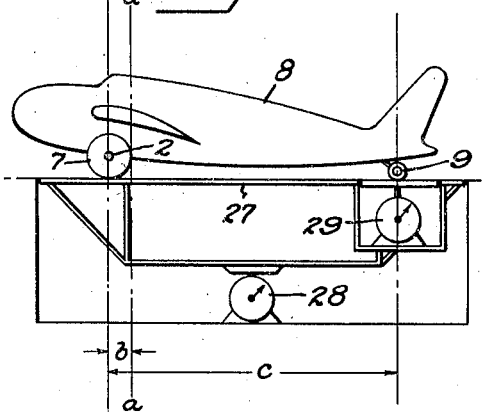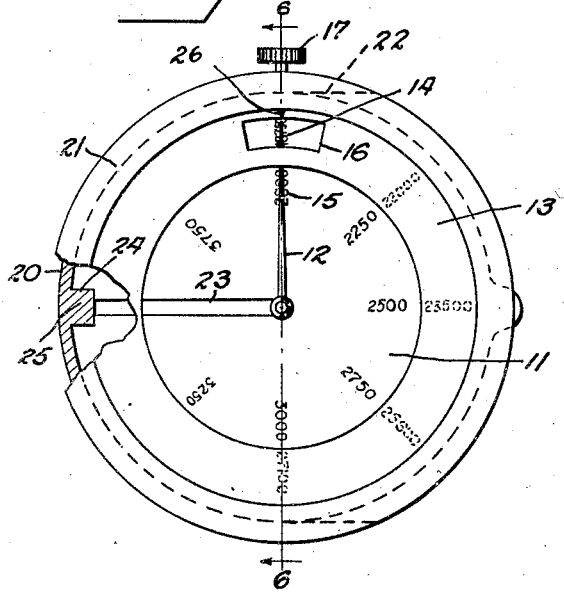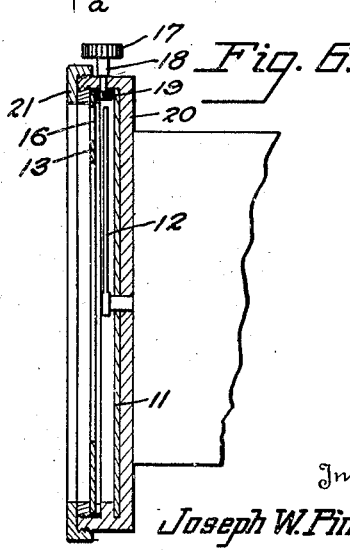
Inventors
Joseph W. Pinder
Alexander Blair Patented Aug. 12, 1947

UNITED STATES PATENT OFFICE 2,425,685

MEANS FOR DETERMINING BALANCE

Joseph W. Pinder, Camp Hill, and Alexander Blair, Harrisburg, Pa.

Application November 14, 1944, Serial No. 563,390

3 Claims. (Cl. 73—65)

This invention relates to a device for indicating the permissible range and direction of movement of the center of gravity from the designed center of gravity due to the load of an aircraft.

There are many fields in which the determination of the center of gravity is desirable. There is one field, however, in which the location of the center of gravity is vital. Aircraft depend upon balance for stability, safety, and maneuverability. In designing aircraft great care is given to the distribution of weight to ensure the proper location of the center of gravity, which is usually found to be slightly to the rear of the leading edge of the wing. The main landing supports of aircraft are positioned slightly forward of the center of gravity in a tail support type aircraft, and slightly to the rear of the center of gravity in the nose support type, so that the weight balance is thrown rearward or forward to cause the aircraft to properly rest on its landing supports. Upon completion, each aircraft is weighed by placing a scale under each of its three points of ground support, the total of the three scales giving the basic weight of the aircraft. From these readings, by mathematical calculation, the actual center of gravity can be determined. The actual center is not always identical to that calculated in the design, and correction of the controls is sometimes necessary to ensure proper handling. The position of the actual center of gravity and permissible variation of that center is recorded and becomes a part of the ship's record.

In operation, the ship must be loaded so that the center of gravity does not shift beyond the permissible variation indicated in the record. Under present practice, the floor plan of the ship and the load to be carried are mathematically correlated before the ship is loaded. The distance of each compartment in the ship from the center of gravity is known, and this figure multiplied by the weight to be placed in the compartment gives the turning moment about the center of gravity. This procedure must be followed for each compartment and the total turning moment determined to ensure proper balance. As is so frequently the case, the predetermined theoretical distribution of the load is not practical in actual practice. Due to bulkiness, or other reasons, the plan cannot be followed. This often necessitates rearranging the load or a portion thereof, which permits the possibility of error and, consequently, aircraft often take off, or attempt to take off, or land, in an unbalanced condition with disaster the possible result.

The object of the present invention is to provide a device whereby a loaded aircraft or other object may be checked to determine the location of a plane including the center of gravity.

It is also an object of the present invention to provide a device whereby a loaded aircraft or other object may be checked to determine whether or not a plane including the center of gravity is located within certain predetermined limits.

A further object of the invention is to provide such a device which may be practiced without disturbing the aircraft or its load.

Another object of the invention is to provide means which may be used by relatively unskilled workmen provided with a minimum of necessary known factors.

A still further object of the invention is to provide means for determining the center of gravity under all conditions and in an unlimited range of factors.

It is also an object to provide means to find the gross weight of an object simultaneously with the determination of its center of gravity.

Other objects of the invention will become apparent from the following detailed description taken in conjunction with the drawings which accompany and form a part of this specification, and throughout the several figures of which the same characters of reference are used to denote identical parts.

In the drawings:

Figure 1 is a diagrammatic view illustrating the principle upon which the present invention is based;

Figure 2 is a diagrammatic view showing the principles applied to determination of the center of gravity of an aircraft of the tail wheel type;

Figure 3 is a view similar to Figure 2 illustrating the application of the invention to an aircraft of the nose wheel type;

Figure 4 is a diagrammatic illustration of a modified application in which gross weight and center of gravity are determined simultaneously;

Figure 5 is a front elevation of a scale dial; and,

Figure 6 is a vertical sectional view taken on the line 6—6 of Figure 5.

Referring to the drawings in detail, the invention can best be understood by a study of the diagram in Figure 1, and an explanation of the method of determining the center of gravity with which the invention is employed before discussing the structure of the invention.

The principle is related to that of an unbalanced lever, the lever being shown at 1, and fulcrumed or pivoted at 2. The lever comprises the two arms 3 and 4. Arm 4, being longer than arm 3, will overbalance arm 3 and the lever will tip downward. The center of gravity of such a lever will be somewhere in the arm 4. In a lever of uniform size and weight distribution from end to end the center of gravity will be at its midpoint as indicated by the line a—a in Figure 1. In any event the center of gravity is located between the fulcrum and one end of the lever.

If a weighing scale is placed under the outer end of the arm 4, the arm 4 will be found to have weight and the weight will register on the scale. The weight so registered will be a basic arm weight for that particular lever when unloaded. The center of gravity, therefore, will be found using the formula $$b = \frac{Pc}{W}$$

where $b$ equals the length of the arm from the fulcrum to the plane of the center of gravity; P equals the weight registered on the scale; $c$ is the length of arm 4; and W is the total weight of the lever.

The lever may be loaded and the center of gravity remain undisturbed if the load is distributed equally on opposite sides of the known center of gravity. It is also possible to balance a heavy weight near the center of gravity by a lighter weight further removed on the opposite side of the center of gravity. This is all based on the well-known principle of levers; weight times lever arm equals turning moment.

It is to be noted that the load is to be distributed equally about the center of gravity, not the fulcrum. As the center of gravity is between the fulcrum and the scale 5, the addition of equal load at equal distances on both sides of the center of gravity, indicated at 6, will render the lever even more unbalanced about its fulcrum and the scale will register a greater amount. The amount registered will be in direct ratio with the gross weight (basic weight plus load) of the lever and center of gravity of the loaded lever. It is, therefore, a simple matter to determine the location of the plane of center of gravity using the formula stated above. It has been found that a lever of specific weight, and having a specific center of gravity, will have an arm weight which increases in proportion to the load when the load is equally distributed on opposite sides of the center of gravity. A dial for the scale 5 may, therefore, be prepared which will indicate the gross weight of lever and load and the correct arm weight for such a gross weight with a known center of gravity. If the lever does not register a weight indicated for the known gross weight, the load is improperly distributed. If the registered weight is too light the center of gravity has shifted toward the fulcrum, if the weight is too great the center has shifted further from the fulcrum.

The above principle may be applied to any object to obtain the plane of center of gravity between a fulcrum point and a point spaced therefrom. The fulcrum may be intermediate the ends as shown or at one extreme end. The scale also may be at any point along the lever other than the fulcrum.

The principle is particularly adaptable to aircraft for determining the proper loading of the ship.

As described hereinbefore, the basic weight and the location of the center of gravity is known and recorded for each particular ship. All ships of one certain model will fall into a single class, the variation from standard being so slight as to fall within the safe limits of permissible variation. Therefore, in applying the principle to aircraft, the center of gravity will be arbitrarily accepted as the standard for the class to which the ship belongs. The main landing wheels 7 become the fulcrum 2, and the ship 8 from the landing wheels to the tail wheel 9 becomes the lever arm 4. The same arm lengths $b$ and $c$ are present. The same holds true on a ship of the nose wheel type. Here the center of gravity is between the landing wheels 7 and the nose wheel 10, and the nose wheel is placed upon the scale 5.

By the use of this principle, the determination of the plane of center of gravity becomes a simple and speedy procedure. The scale 5 will indicate the tail or nose weight of the plane, and by the substitution of the known factors in the formula $$b = \frac{Pc}{W}$$

the plane of center of gravity is determined. If this result falls within the range of permissible variation for the particular class of ship, the load is properly stored and the aircraft may take off with assurance. If the result is not within this range the load will have to be shifted to reestablish a balanced condition.

To simplify the process, and eliminate the greater portion of the mathematical calculations, charts may be prepared for each model of aircraft. These charts will show the basic weight of the ship and its established center of gravity. They will also contain a list of gross weights ranging from the basic weight to the limit of capacity of the ship. Beside each gross weight will be listed the minimum and maximum tail or nose weights for that load which will represent the limits of permissible variation. It will be understood that variations in the distance between the landing and tail or nose wheels due to load being imposed will be compensated for in the charts.

The present invention facilitates this procedure by providing a dial, such as is shown in Figures 5 and 6, connected to the weighing scale. This dial may be positioned on the scale as shown in the drawings. Its function is to give instant visual indication as to whether the ship is properly loaded or whether the center of gravity has been shifted beyond the permissible range.

The dial shown comprises a disk 11 over which an indicating hand 12 is freely movable, and an adjustable ring 13 overlying the disk and hand. Near its periphery the disk 11 is graduated to indicate gross weight. Concentrically, but closer to the center, a second series of graduations are provided to indicate tail weights. The gross weight scale and the tail weight scale are shown respectively at 14 and 15. The figures in the tail weight scale represent standard tail weights for the gross weights directly above.

The annular ring 13 is provided with a window 16 through which the gross weight figures may be seen. Only those gross weight figures under the window are visible, as the ring 13 completely covers the others. Ring 13 is adjustable by means of the knob 17 which is mounted on a stem 18 carrying a small pinion 19 at its lower end. Pinion 19 meshes with an annular series of teeth on the back of the ring 13. Rotation of knob 17 causes the ring to move and the window 16 to shift its position. Any suitable mounting for the dial and ring may be used. In the present showing they are mounted in a housing 20 which is provided with a cap 21. The housing may be provided with a slot 22 whereby dials with graduations for different models of ships may be inserted. The dial card may conveniently be provided with a slot 23 to bypass the hand shaft, and the slot may be enlarged at its outer end to embrace a positioning lug 25 carried by the housing. This structure is merely by way of example.

In use, the knob 17 will be rotated until the arrow 26 above the window 16 is aligned with a gross weight figure representing the weight of the ship and its load. When the weight rests upon the platform the hand 12 will swing to indicate the tail weight. The hand is sufficiently long to extend into the window opening 16, and the window is of such annular length as to indicate the correct range of permissible variation in center of gravity as defined in terms of tail weight variation. When the hand has come to rest, the ship is properly loaded if the hand is visible in the window opening 16, and improperly loaded if the hand is not visible in the window.

To further simplify the operation, a large platform 27, Figure 4, may be provided upon which the entire aircraft may rest. This platform is supported upon weighing mechanism 28 which will register the entire weight of the aircraft. The platform will incorporate a second weighing mechanism 29 upon which the tail or nose wheel of the plane will rest. By such an arrangement all calculations may be eliminated as the gross weight is registered on the dial of the weighing mechanism 28 and the basic weight of the plane and the weight of the load need not be added. The figure shown on the scale 28 can be set into the dial of the scale 29 and the result is instantly visible.

Although this description has been directed to use with aircraft, the device of the invention is not limited thereto. As stated above, the device may be used with any object which may be fulcrumed and the resulting lever arm weighed. The structure shown is illustrative only, and in detail only insofar as is necessary to show the application of the principle and means for carrying out that principle. It is obvious that many changes may be made from the precise structure shown, and it is desired that the invention be limited only by the scope of the appended claims.

What is claimed is:

1. A device for indicating the permissible range and direction of movement of the center of gravity due to the load of an aircraft having supports located in planes transverse to its longitudinal axis comprising, weighing mechanism to support one of said supports of said aircraft while the other of said supports serves as a fulcrum, and an indicator connected to said weighing mechanism, said indicator comprising a pointer, a primary dial having two correlated series of graduations bearing indicia indicating respectively gross weight of the aircraft and corresponding weights of the weighed support, and a secondary dial rotatable relative to said primary dial and being of such size as to cover said gross weight graduations only and having a window therein through which a portion of said gross weight graduations and said pointer are visible, said window being proportioned to reveal only such segment of said gross weight graduations as represents permissible variations in center of gravity location for a given gross weight.

2. A device for simultaneously indicating the weight and the permissible range and direction of movement of the center of gravity due to the load of an aircraft having supports located in planes transverse to its longitudinal axis comprising, a platform upon which one of said supports of said aircraft may rest, a weighing mechanism operatively connected to said platform to register weights imposed upon said platform, a second weighing mechanism carried by said platform, and a second platform upon which the other of said supports may rest, said second platform being connected to said second weighing mechanism and lying substantially in the plane of said first platform whereby the gross weight of the aircraft will be registered upon said first weighing mechanism and the weight carried by the other of said supports will be registered upon said second weighing mechanism.

3. In a device as claimed in claim 2, said second weighing mechanism having an indicator connected thereto comprising a pointer, a primary dial having two correlated series of graduations bearing indicia indicating respectively the gross weight of the aircraft and corresponding weights of the weighed support, and a secondary dial rotatable relative to said primary dial and being of such size as to cover said gross weight graduations only and having a window therein through which a portion of said gross weight graduations and said pointer are visible, said window being proportioned to reveal only such segment of said gross weight graduations as represents permissible variations in center of gravity location for a given gross weight.

JOSEPH W. PINDER.
ALEXANDER BLAIR.

REFERENCES CITED

The following references are of record in the file of this patent:

UNITED STATES PATENTS

| Number | Name | Date |
|---|---|---|
| 1,598,796 | Williams | Sept. 7, 1926 |
| 557,140 | Munson | Mar. 31, 1896 |
| 1,218,253 | Gordon | Mar. 6, 1917 |
| 1,888,298 | Teesdale | Nov. 22, 1932 |
| 2,255,814 | Roche | Sept. 16, 1941 |
| 2,336,142 | Watson | Dec. 7, 1943 |
| 2,373,504 | Schlieben et al. | Apr. 10, 1945 |

FOREIGN PATENTS

| Number | Country | Date |
|---|---|---|
| 267,214 | Great Britain | Mar. 9, 1927 |
| 452,826 | Great Britain | Aug. 31, 1936 |
| 606,958 | Germany | Dec. 14, 1934 |
| 698,338 | Germany | Nov. 7, 1940 |